E. J. MONTIGNY.
WIND SHIELD.
APPLICATION FILED MAY 14, 1909.
959,374.
Patented May 24, 1910.
2 SHEETS—SHEET 1.
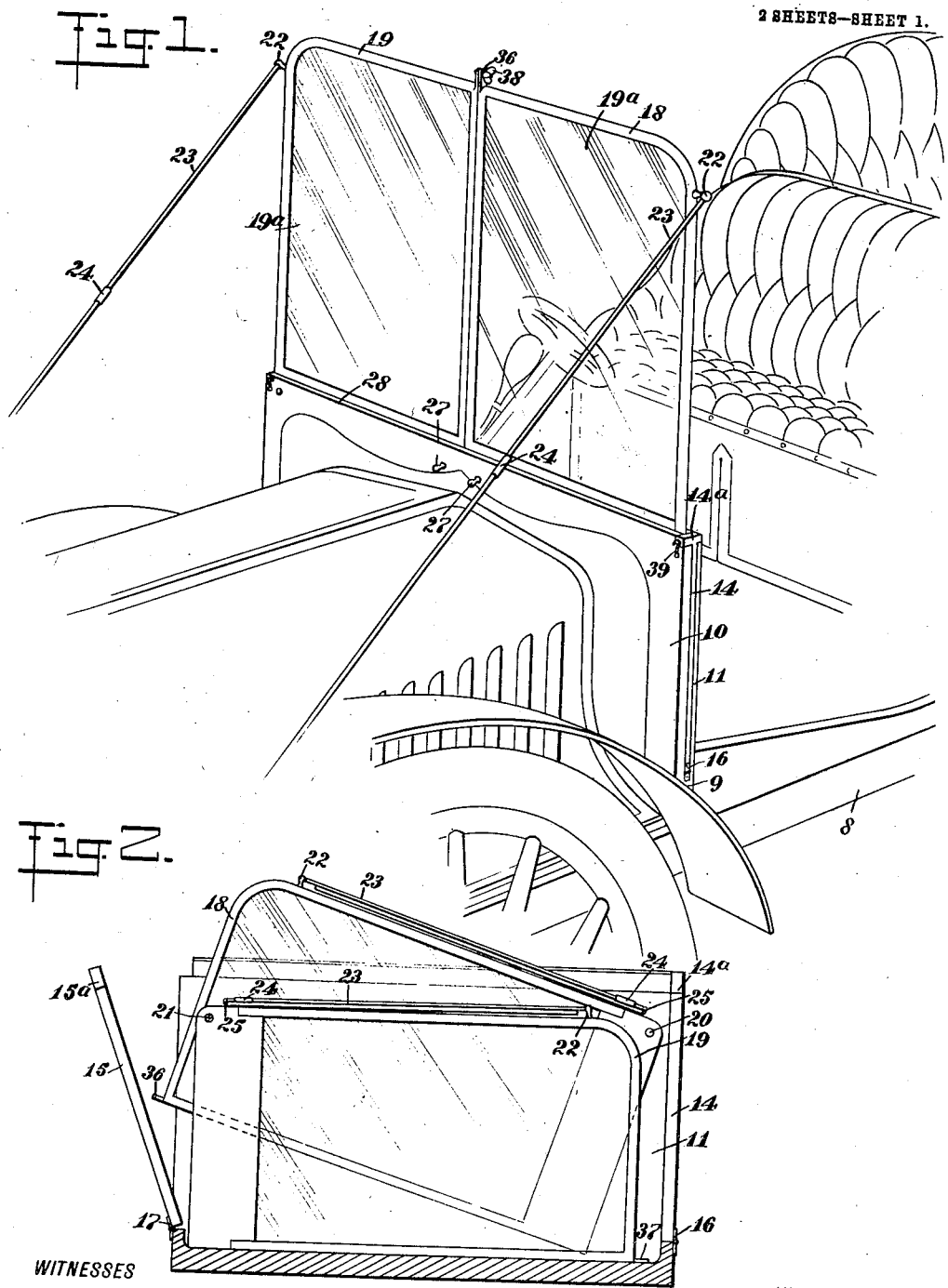
WITNESSES
INVENTOR
Emile J. Montigny
BY 
ATTORNEYS E. J. MONTIGNY.
WIND SHIELD.
APPLICATION FILED MAY 14, 1909.
959,374.
Patented May 24, 1910.
2 SHEETS—SHEET 2.
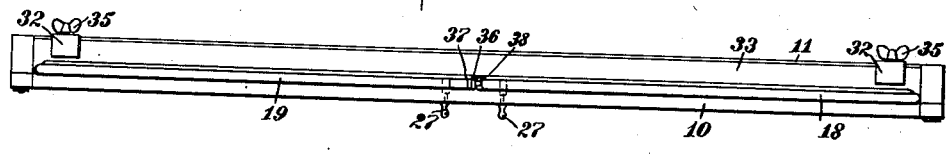
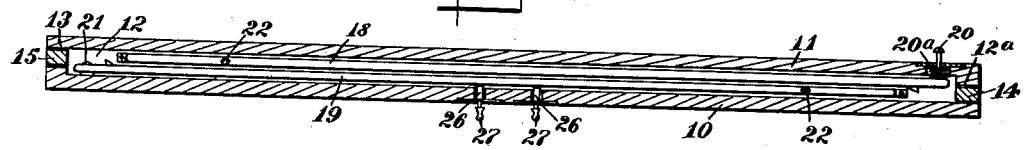
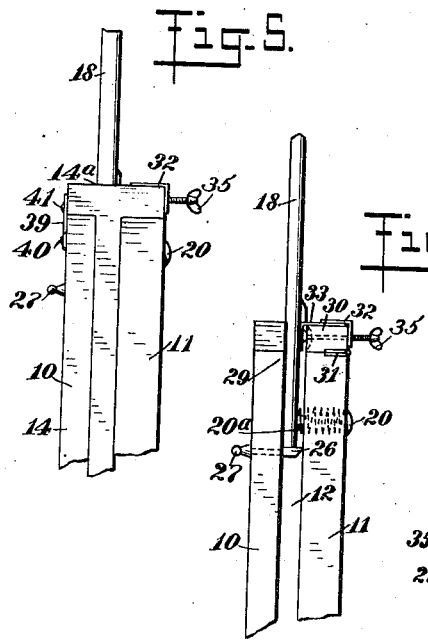
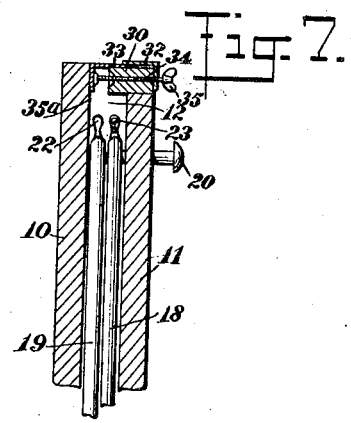
WITNESSES
INVENTOR
Emile J. Montigny
BY
ATTORNEYS

UNITED STATES PATENT OFFICE.

EMILE J. MONTIGNY, OF NEW YORK, N. Y.

WIND-SHIELD.

959,374.   Specification of Letters Patent.   Patented May 24, 1910.

Application filed May 14, 1909. Serial No. 495,956.

*To all whom it may concern:*

Be it known that I, EMILE J. MONTIGNY, a citizen of the United States, and a resident of the city of New York, borough of Brooklyn, in the county of Kings and State of New York, have invented a new and Improved Wind-Shield, of which the following is a full, clear, and exact description.

My invention relates to wind shields for use in connection with automobiles and other rapidly moving vehicles, my more particular purpose being to provide a wind shield comprising a two-part sash adapted to fold neatly into the dash board which is of special structure in order to receive the shield.

My invention further relates to various details associated with the two-part folding sash to facilitate the handling and storing thereof, and to give the shield a sufficient degree of rigidity when in active use.

My invention further relates to various details of mechanism used in connection with wind shields generally for the purpose of improving the efficiency of the same.

Reference is to be had to the accompanying drawings forming a part of this specification, in which similar characters of reference indicate corresponding parts in all the figures.

Figure 1 is a fragmentary perspective of an automobile provided with my improved wind shield and showing said shield in active use; Fig. 2 is a vertical cross section through the dash board, showing one of the sashes lowered and the other almost lowered, for the purpose of storing these parts within the dash board; Fig. 3 is a fragmentary plan view of the dash board complete, showing its appearance when the wind shield is raised and clamped in position ready for active use; Fig. 4 is a horizontal section through the dash board, showing the two parts of the wind shield in the position they occupy when stored within the dash board. Fig. 5 is a fragmentary side elevation, showing the wind shield raised and in active use; Fig. 6 is a view similar to Fig. 5; and Fig. 7 is a fragmentary vertical section through a portion of the dash board showing how the two parts of the wind shield are stored therein when not in active use.

At 8 is the chassis of an automobile and at 9 is the dash board thereof, this dash board comprising a front panel 10 and a back panel 11 separated by a slot 12, this slot having contracted portions 12$^a$, 13, as will be understood from Fig. 4. At 14, 15 are side panels adapted to fit into the contracted portions 12$^a$, 13 of the slot just mentioned, these side panels being secured in position by aid of hinges 16, 17. At 18, 19 are sashes each carrying a pane of glass 19$^a$, or other transparent material. These sashes are journaled upon pins 20, 21, the pin 21 being an ordinary pivot pin rigidly secured to the panel 10 and the pin 20 being connected with a spring 20$^a$ (see Fig. 4) and thus adapted to press upon the sash 18.

Mounted upon the sashes 18, 19 are pivotal eyes 22 and engaging the same are brace rods 23 provided with sleeves 24 slidably mounted thereupon and further provided with knuckle joints 25 by aid whereof the brace rods can be bent upon themselves or doubled as indicated in Fig. 2, and when extended as indicated in Fig. 1 may be rendered rigid by aid of the sleeves 24 which for this purpose are merely slipped over the knuckle joints.

Two latch pins 26 are slidably mounted within the panel 10 (see Fig. 4) and are provided with handles 27 whereby they may be manipulated. When the sashes are lowered into the slots 12 as indicated in Fig. 4, the latch pins 26 are drawn out by aid of the handles 27 so as to accommodate the sashes.

A strip 30 is mounted upon the top edge of the panel 11, being movably secured thereto by aid of hinges 31, as will be understood from Fig. 6. This strip may, by aid of hinges 31, be stood upon edge. Secured rigidly to the strip 30 are L-shaped guides 32 which extend over the top of the strip 30 and are spaced slightly therefrom, as indicated in Fig. 6. A guide strip 33 extending practically the entire length of the dash board is movably mounted upon the top of the strip 30 (that is, when this strip occupies the position indicated in Figs. 6, 7). This guide strip 33 extends intermediate the strip 30 and the guides 32, being loose relatively to the same, as will be understood from Fig. 6.

At 34 are screws provided with wings 35 and adapted to be turned by hand by aid of these wings. Each of these screws is provided with a shoe 35$^a$ which engages directly the lower portion of the guide strip 33, as will be understood from Figs. 6, 7. At 36, 37 (see Figs. 2, 3) are two lugs mounted rigidly upon the sashes 18, 19. A wing screw 38 connects these lugs together and secures the sashes rigidly to each other, as indicated in Fig. 1. This wing screw is removable, however, for the purpose of enabling the sashes to be swung downwardly as indicated in Fig. 2.

Mounted upon the panel 10 are pins 40, and journaled upon the latter are hooks 39 which engage pins 41, these pins 41 being mounted upon heads 14ª, 15ª at the tops of the side panels 14, 15.

The operation of my device is as follows: The sashes 18, each have two normal positions. When not in active use these sashes are swung downwardly into their lowermost positions within the slot 12 as indicated in Fig. 4, the side panels 14, 15 now occupying the contracted portions 12ª, 13 of the slot 12. The spring 20ª now presses against the panel 18 and the latches 26 occupy the positions indicated in Fig. 4, as above stated. The strip 30 rests upon its side according to these figures. The sashes 18, 19 are now completely inclosed on all sides and the various parts may remain in their respective positions for any desired length of time. Suppose, now, that it is desired to put the wind shield into use. The operator turns the strip 30 upon its edge. He next raises the sash 19, swinging it upward upon the pivot pin 21 as a center. To enable him to do this the end panel 14 may be swung outward. The sash 18 is raised similarly and owing to the pressure of the spring 20ª the sash 18 is pushed thereby toward the panel 10 until the sash 18 comes into alinement with the sash 19, as indicated in Figs. 1, 5 and 6. The latch pins 26 now extend into the slot 12 and the sashes 18, 19 rest directly upon these latch pins. The parts being brought into the several positions just described, the operator turns the wings 35, thereby rotating the screws 34 and jamming the shoes 35ª directly against the sashes 18, 19, so as to hold the latter securely in position. The brace rods 23 are lengthened out and the sleeves 24 moved slightly and thereby slipped over the knuckle joints 25, the brace rods being secured at their forward or loose ends to the chassis or some other part of the framework of the vehicle. The hooks 39 are brought into engagement with the pins 41, as indicated in Fig. 5. Everything about the dash board and sashes is now perfectly rigid and the vehicle may be driven at any desired rate of speed, without undue danger of anything becoming loose or broken. Suppose, now, that the operator desires to store the wind shield within the dash board. He does this by simply reversing the operation above described with reference to Fig. 7. That is to say, he disconnects the brace rods 23 at their forward ends, slips the sleeves 24 slightly backward and folds the brace rods as indicated in Fig. 2. He then swings the side panels 14, 15 outwardly, as indicated in Fig. 2, and lowers the sashes upon the respective pivot pins 21, 20 as centers. Finally he swings the side panels 14, 15 back into their respective normal positions and turns the strip 30 (see Fig. 7) upon its side so that it serves as a cover for the sashes. The pin 20 now occupies the position indicated in Fig. 7 and presses hard against the sash 18.

Having thus described my invention, I claim as new and desire to secure by Letters Patent:

1. The combination of a dash board provided with a panel, a plurality of sashes journaled relatively to said panel and disposed to fold side by side in planes parallel therewith, one of said sashes having a diagonal measurement greater than the width of said panel, and a side panel journaled relatively to said first-mentioned panel and adapted to fold relatively thereto for the purpose of protecting the edges of said sashes when the latter are folded.

2. The combination of a dash board provided with a front panel and a back panel separated by a slot, a plurality of sashes journaled relatively to said dash board and adapted to swing into said slot, one of said sashes having a diagonal measurement greater than the width of said slot, and side panels journaled relatively to said dash board and adapted to swing into said slot for the purpose of partially closing the same.

3. The combination of a dash board provided with a plurality of panels, sashes journaled relatively to said dash board and adapted to be folded intermediate said panels, also to be unfolded, one of said sashes having a diagonal measurement greater than the width of said panels being mounted loosely so as to swing into and out of the plane occupied by the other of said sashes, and clamping mechanism for holding said sashes rigid relatively to each other and to said dash board when said sashes occupy the same plane.

4. The combination of a dash board, sashes connected therewith and adapted to swing, a strip journaled upon the upper edge of said dash board and adapted to swing in a plane crossing the general direction of said sashes, and clamping mechanism carried by said strip for the purpose of clamping said sashes relatively to said dash board.

In testimony whereof I have signed my name to this specification in the presence of two subscribing witnesses.

EMILE J. MONTIGNY.

Witnesses:
 DAVID WILLIAMS,
 CHARLES CORKEY.